United States Patent
Kim et al.

(10) Patent No.: US 6,521,016 B2
(45) Date of Patent: Feb. 18, 2003

(54) METHOD OF PRODUCING NANOPHASE CU-$Al_2O_3$ COMPOSITE POWDER

(75) Inventors: Byoung Kee Kim, Kyungsangnam-do (KR); Dong Won Lee, Kyungsangnam-do (KR)

(73) Assignee: Korea Institute of Machinery and Materials, Kyungsangnam-do (KR)

( * ) Notice: Subject to any disclaimer, the term of this patent is extended or adjusted under 35 U.S.C. 154(b) by 0 days.

(21) Appl. No.: 09/827,366

(22) Filed: Apr. 5, 2001

(65) Prior Publication Data

US 2001/0054328 A1 Dec. 27, 2001

(30) Foreign Application Priority Data

Apr. 7, 2000 (KR) .............................. 00-18099

(51) Int. Cl.[7] ............... B22F 9/24; C01F 7/30
(52) U.S. Cl. ............... 75/351; 75/363; 75/365; 423/115; 423/600
(58) Field of Search .................. 75/351, 363, 364, 75/365, 370, 371; 423/115, 600

(56) References Cited

U.S. PATENT DOCUMENTS

| | | | |
|---|---|---|---|
| 4,751,070 A | * 6/1988 | Verneker | ................ 423/600 |
| 5,352,269 A | * 10/1994 | McCandlish et al. | ......... 75/351 |
| 5,744,118 A | * 4/1998 | Imamura et al. | ............. 423/600 |
| 6,136,083 A | * 10/2000 | Schmidt et al. | ............. 106/403 |

* cited by examiner

Primary Examiner—George Wyszomierski
(74) Attorney, Agent, or Firm—Thompson Coburn LLP

(57) ABSTRACT

The present invention relates to a method of producing nanophase Cu—$Al_2O_3$ composite powder by means of 1) the producing precursor powders by centrifugal spray drying process using the water base solution, in which Cu-nitrate ($Cu(NO_3)_2 3H_2O$) and Al-Nitrate ($Al(NO_3)_3 9H_2O$) are solved to the point of final target composition (Cu-1 wt %/$Al_2O_3$),2) the heat treatment process (desaltation process) at the 850° C. for 30 min in air atmosphere to remove the volatile components such as the moisture and $NO_3$ group in precursor powder and simultaneously to synthesize the nano CuO—$Al_2O_3$ composite powders by the oxidation of corresponded metal components and 3) the reduction heat treatment of CuO at 200° C. for 30 min in reducing atmosphere to produce the final nanophase Cu—$Al_2O_3$ composite powders with the size below 20 nm.

3 Claims, 4 Drawing Sheets

(a) Spray dried powder  (b) desalted power
(c) reduced  (d) Sintered bodies (a) Spray dried powder  (b) desalted powder
(c) Results of X-ray diffraction analysis of the powders a) 550°C   b) 700°C   c) 850°C

METHOD OF PRODUCING NANOPHASE CU-AL$_2$O$_3$ COMPOSITE POWDER

TECHNICAL FIELD

The present invention relates to a new method for producing Cu—Al$_2$O$_3$ composite powder having particle sizes less than 20 nm by thermo-chemical process. Its technology comprised in (1) the production of precursor powders by spray drying a water base solution made of water-soluble Cu and Al nitrates, (2) the heat treatment processing (desalting processing) in air atmosphere to remove the volatile components such as the moisture and NO$_3$ group, and simultaneously to synthesize the nanophase CuO—Al$_2$O$_3$ composite powders and (3) the reduction processing of CuO to Cu to produce the nanophase Cu—Al$_2$O$_3$ composite powder.

BACKGROUND OF THE INVENTION

It is well known that if the alumina particles are extremely fine and homogenous in the dispersion-strengthened Cu matrix-Al$_2$O$_3$ dispersed composite, the material strengths at room temperature can be still maintained up to the near melting point of copper due to the excellent dispersion-strengthening effect. And the loss of matrix electric conductivity is not also significant because the total alumina volume fraction can be minimized in favor of the nano particle size.

Consequently, based on the aforementioned characteristics of Cu—Al$_2$O$_3$ composites, these materials are extensively used as the high strength electric materials such as electrode for spot welding, lead wires, relay blades, and contact supports, and so on.

Especially, in the case of electrode materials used as the assembly for spot welder to join the body of the large vehicles, trains or robots, it requires superior strength at a high temperature and arcwear resistance for electrical discharge.

Neither the casting process nor the conventional powder metallurgy (P/M) process are suitable to produce such materials, because these processes always result in the possibility of segregation of hard particles and the limitation to produce or to distribute to ultra fine particles uniformly into meta matrix. Consequently these components should be manufactured by the P/M process through the preparation of composite powder containing the nano alumina particles.

Conventionally the nanophase Cu—Al$_2$O$_3$ composite powder has been produced by internal oxidation process. This method consists of following steps: (1) gas atomizing process to produce the Cu/Al alloy powder, (2) heat treatment in air or oxygen contained atmosphere for internal oxidation to produce CuO and Al$_2$O$_3$ composite powder, and (3) production of Cu—Al$_2$O$_3$ composite powder by means of the reducing CuO to Cu in hydrogen atmosphere.

The particle size of Al$_2$O$_3$ in the composite powder produced by means of the aforementioned internal oxidation has been known to 50 μm in average. And oxygen during internal oxidation is diffused along the coarse Cu grain boundary. It can result in a segregation of oxide phase in grain boundary, moreover such non-uniformed hard phase can affect negatively the mechanical properties of the bulk materials produced by extrusion process.

SUMMARY OF THE INVENTION

Accordingly, in solving the aforementioned problems, the technical objective of the present invention lies in producing nanophase Cu—Al$_2$O$_3$ composite powder having homogenous distribution of oxide particles.

Therefore the method of the present invention comprises as follows:

1. The process of preparing a water base solution by dissolving the water-soluble salts of Cu-Nitrate (Cu(NO$_3$)$_2$3H$_2$O) and Al-Nitrate (Al(NO$_3$)$_3$9H$_2$O) for spray drying process.
2. The spray drying of prepared water base solution to produce a precursor powder consisting of a molecular scale mixture of Cu, Al, NO$_3$—groups and moisture.
3. The process of desalting heat treatment in air atmosphere to remove the volatile components such as the moisture and NO$_3$ and simultaneously to synthesize the nanophase CuO—Al$_2$O$_3$ composite powders.

The process of the heat treatment in hydrogen atmosphere to reduce the copper oxide to pure copper and finally to produce the nanophase CuO$_3$—Al$_2$O$_3$ composite powders.

DETAILED DESCRIPTION OF THE PREFERRED EMBODIMENT

The present invention is described by means of examples as follows:

EXAMPLE 1

With the weight measurements of Cu-nitrate and Al-nitrate to the point of final target composition (Cu-1 wt % Al$_2$O$_3$), the solution was prepared by dissolving the nitrates in distilled water. Then the solution was fed on the rotational disk to form the fine droplet into the hot chamber, and sprayed droplets are changed to precursor powder by drying in the atmosphere of the hot air. The condition of spray drying, were set as follows: the temperature of intake air is about 240–260° C., the temperature of exhaust air is 100–130° C., disk rotation speed lies in the range of 8,000–14,000 rpm, and the solution feed rate is 30–80 ml/min.

Figure 1:
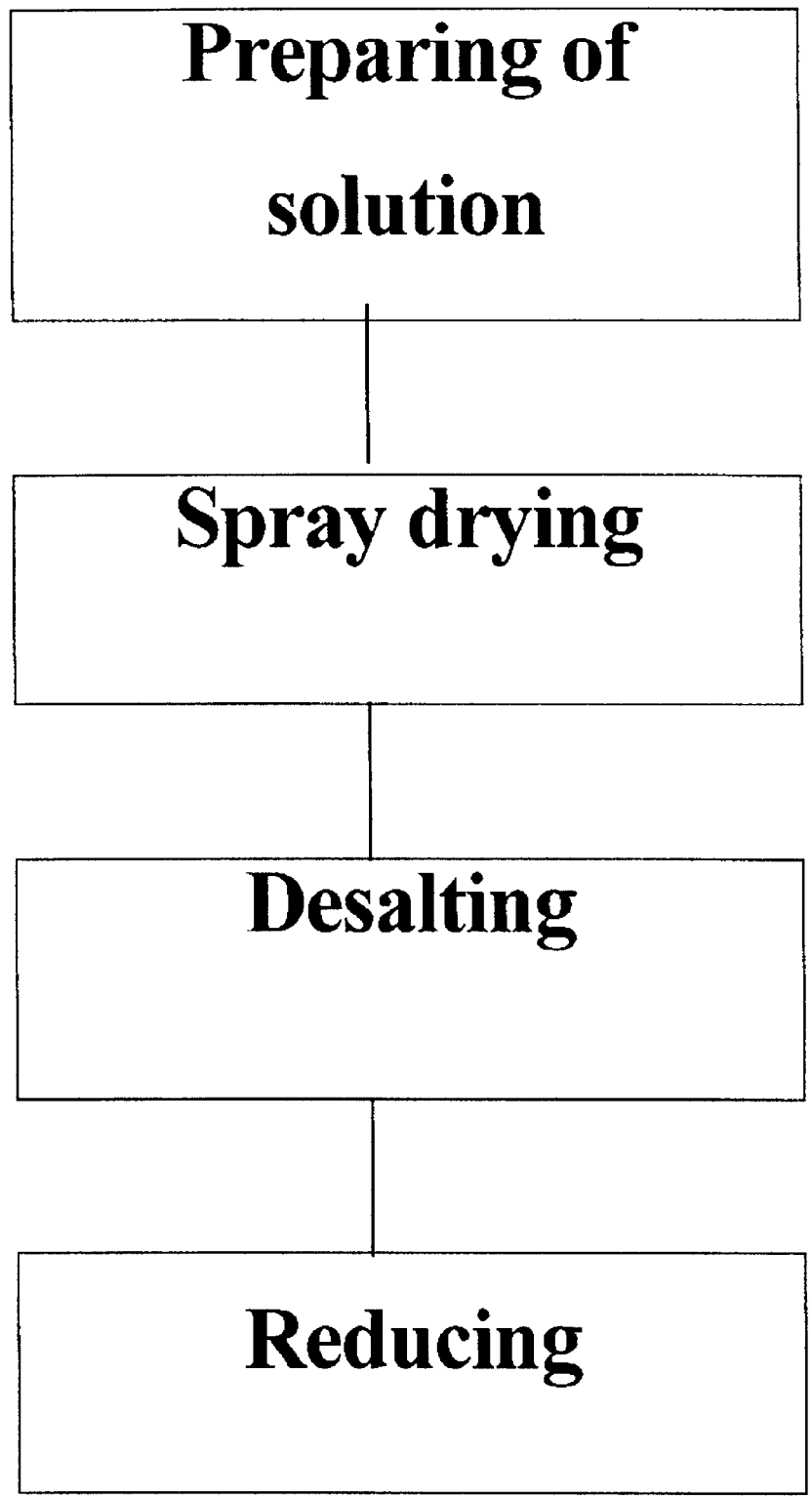
FIG. 1 is a flowchart for producing nanophase Cu-Al$_2$O$_3$ composite powder.
Figure 2:
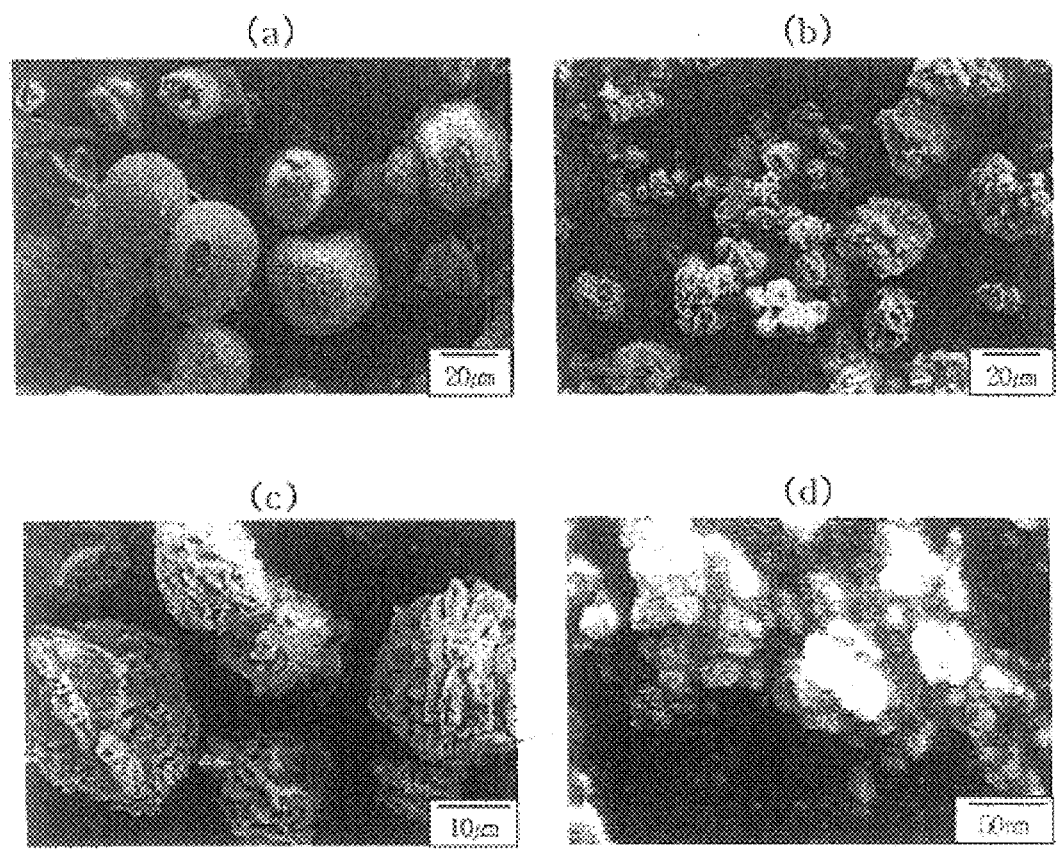
FIGS. 2(a)–(d) are micrographs of the samples as per respective steps of the process: (a) spray dried powder, (b) desalted powder, (c) reduced powder, (d) sintered bodies.
Figure 3:
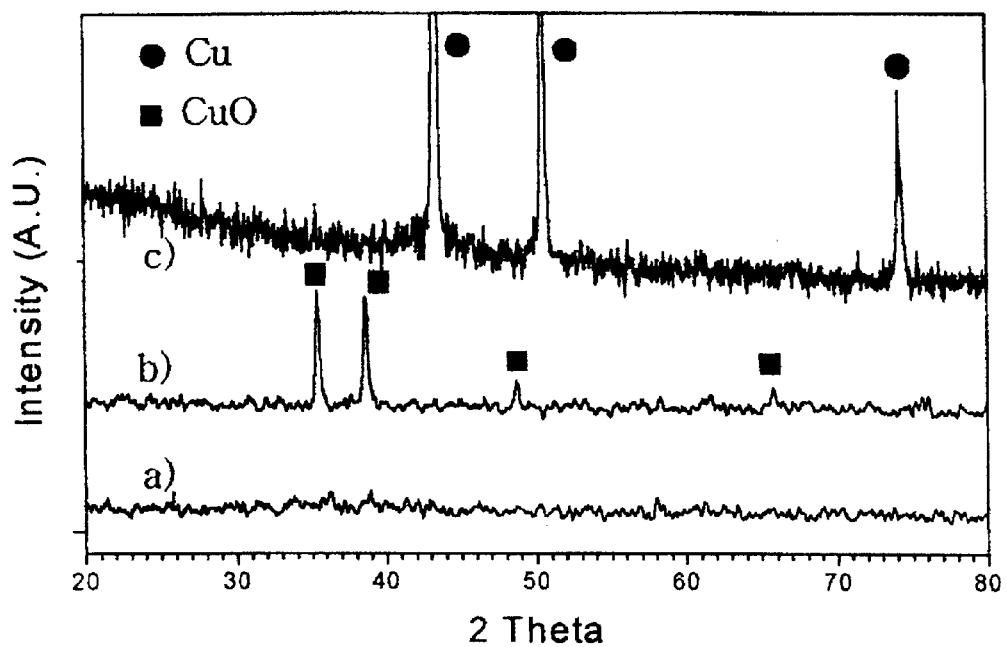
FIG. 3 shows the results of X-ray diffraction analysis of the powders presented in FIGS. 2(a)–(d), i.e., the spray dried powder, desalted powder, and reduced powder.

The shape, size and structure of precursor powder are observed by scanning electron microscopy (SEM) and X-ray diffraction (XRD) methods in FIG. 2(a) and FIG. 3, respectively.

As shown in the above figures, the sizes of precursor powders are in the range of 20–80 μm, and in the results of XRD analyses it has an amorphous state, which means that the precursor powder has a homogeneous cohesion of respective components of Cu, Al and $NO_3$ at a molecular level.

Then the precursor powders are desalted by heat treatment in the air atmosphere at 850° C. for 30 min. XRD and SEM results after the desalting process are shown in FIGS. 2(*b*) and 3 respectively. As shown in the XRD results, the most of desalted powders were CuO, and the non-existence of $Al_2O_3$ peaks was due to fact that the amount of this component was lower than background trace.

After that, the powder consisting of CuO and $Al_2O_3$ was reduced at 150° C. for 1 hour, 200° C. for 30 minutes, and 200° C. for 1 hour in the hydrogen atmosphere. The results of XRD analysis for reduced powders are shown in FIG. 4 correspondingly.

Figure 4:
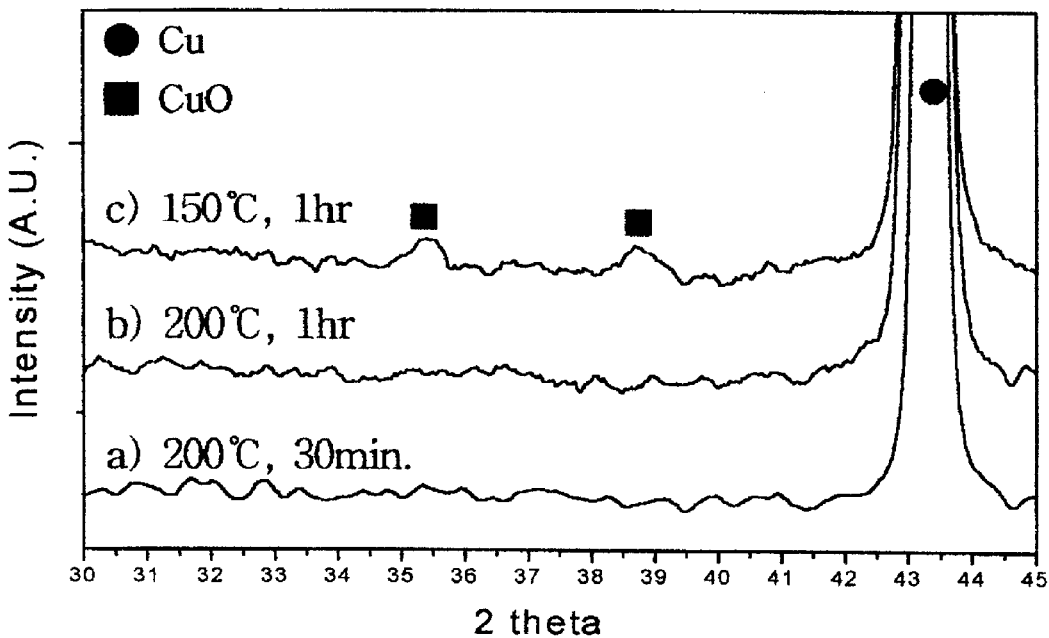
FIG. 4 shows the results of X-ray diffraction analysis of reduced powders, depending on the reduction times and temperatures.

As shown in FIG. 4, the powder after reduction at 150° C. for 1 hour was determined to be a mixed state of CuO and Cu, which suggests that CuO is not completely reduced yet. In the reduction at the 200° C. for 30 min and 1 hour, there was no CuO phase(FIG. 4), which implies complete reduction. So, the optimal reduction conditions can be considered at 200° C. for 30 minutes. FIGS. 2(*c*) and 3 were obtained from the reduced powder produced through its optimal reduction conditions.

It was difficult to observe the particle size of copper directly in the structure of reduced powder, because these particle sizes are too fine for observation. Consequently to observe the copper particles, the powder was compacted by normal way and sintered at 700° C. for 30 min. FIG. 2(*d*) is the SEM microstructure of the sintered sample observed at the high magnification (×200,000). Here the particles of Cu are approximately 20 nm or less in diameter. As such, in consideration of the possibility of Cu particle growth during sintering, the size of Cu particles in the reduced powder would be less than that of sintered state.

Figure 5:
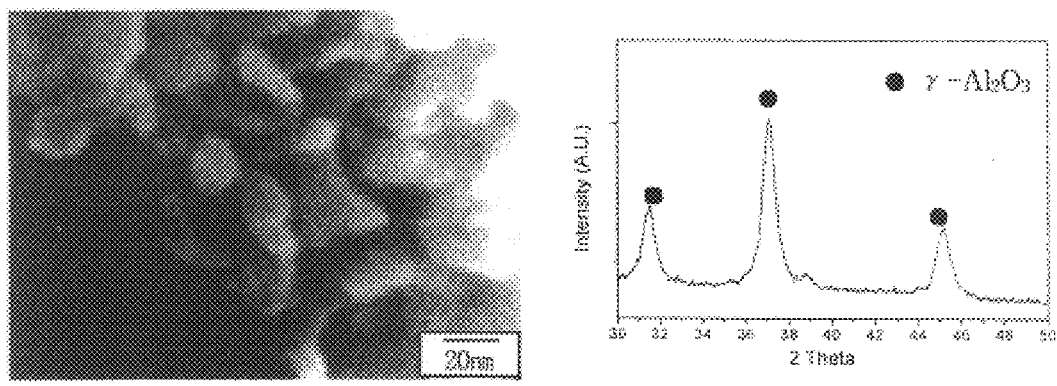
FIG. 5 depicts a micrograph and an X-ray diffraction pattern of the Al$_2$O$_3$ particles extracted from the reduced powder after the desalting heat treatment at 850° C. for 30 min.

For the purposes to observe the $Al_2O_3$ particles within the reduced powder, the base component of the reduced powder (i.e., Cu) was dissolved in aqueous solution of nitric acid, and then the particles of $Al_2O_3$ were extracted by filtering with 0.45 μm in mesh. To dissolve the Cu matrix, the concentration of nitric acid in the aqueous solution was set to be 25 vol. %, and the dissolving time was required to 24 hours. The SEM micrographs of extracted particles and its X-ray diffraction result are shown in FIGS. 5(*a*) and 5(*b*), respectively, confirming that the $Al_2O_3$ were in gamma alumina phase (phaseR) with the size of 10–20 nm.

Consequently, as shown by the results of Example 1, the fine Cu—$Al_2O_3$ composite powder with the particle size of 20 nm or less could be produced by the method of the present invention. Further, for observing the behavior of $Al_2O_3$ formation, depending on desaltation time and temperature, the experiments were carried out in Example 2 with said variables.

EXAMPLE 2

The processes for preparing the solutions, the spray-drying process, and the reduction of oxide powder were carried out in the same manner as Example 1. The powders were prepared with the variable desaltation time and temperature. Then Cu was dissolved and extracted in the same manner as Example 1. Extracted alumina oxide particles were investigated by XRD method. The desaltation temperatures were 550, 750, and 850° C. respectively (850° C. in used in Example 1) and at these temperatures the treating time was 30 minutes and 2 hours. The results thereof are shown in FIG. 6.

Figure 6:
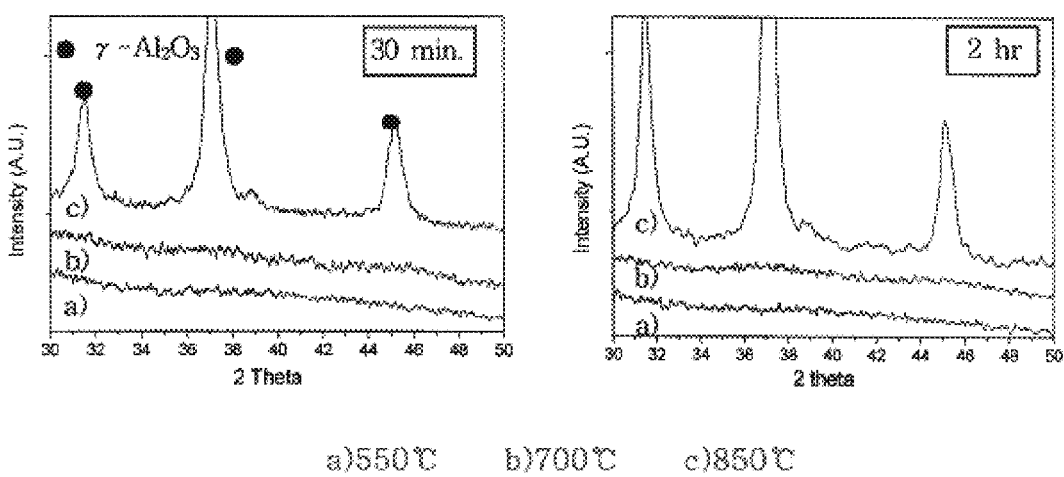
FIG. 6 shows the results of the X-ray diffraction analysis of Al$_2$O$_3$ phase within reduced powder, depending on time and temperature of preliminary desalting heat treatment of precursor powder.

As shown in FIG. 6, irrespective with the time, after the treatment at the temperatures of 550° C. and 750° C., there was no gamma alumina phase. But at the temperature of 850° C. (as in Example 1), the gamma alumina oxide phase appeared in all cases, irrespective with treating time. It leads to conclusion that the optimal temperature for the formation of stable alumina particles is 850° C.

The table as below is a summary of the conditions and results of Examples 1 and 2. As shown below, the optimal desaltation condition was at 850° C. for 30 min. The Optimal reduction temperature was 200° C. for the time of 30 min. At these conditions, the highest quality of Cu—$Al_2O_3$ composite powder could be produced at the lowest energy.

Table of Synthesis Conditions and Results of Nanophase Cu/$Al_2O_3$ Composite Powder

| Process | Conditions | | Results |
|---|---|---|---|
| Preparing the Solutions | Cu-Nitrate + Al-Nitrate + water | | (Mix ratios of the respective components may vary depending on the target composition) |
| Conditions for Spray-drying | Centrifugal Spray-drying Rotational Speed of the Disc: 8,000–14,000 rpm Temperature of Intake Air: 240° C.–260° C. Temperature of Exhaust Air: 100° C.–130° C. Feed Rate of Solutions: 30–80 ml/min | | Particle Size: 20–80 μm Particle Form: Amorphous |
| Desaltation heat-treatment (in air) | 550° C. | 30 minutes | Synthesis of CuO without $Al_2O_3$ formation |
| | | 2 hours | Synthesis of CuO without $Al_2O_3$ formation |
| | 700° C. | 30 minutes | Synthesis of CuO without $Al_2O_3$ formation |
| | | 2 hours | Synthesis of CuO without $Al_2O_3$ formation |
| | 850° C. | 30 minutes | Synthesis of CuO and $Al_2O_3$ (Particle Size of $Al_2O_3$: approximately 20 nm) |
| | | 2 hours | Synthesis of CuO and $Al_2O_3$ (Particle Size of $Al_2O_3$: approximately 20 nm) |
| Reduction (in $H_2$) | 150° C. | 1 hour | Incomplete Reduction |
| | 200° C. | 1 hour | Complete Reduction |
| | | 30 minutes | Complete Reduction (Particle Size of Cu: 20 nm or below) |

The method of producing nanophase Cu—$Al_2O_3$ composite powder by means of the thermo-chemical method of the present invention has the effect of enhancing the characteristics of the materials by producing the nanophase Cu—$Al_2O_3$ composite powder with the size of 20 nm or below. Moreover the present invention has the effect of an economical benefit due to the unlimited composition control, simplicity of process, and low reaction temperature.

What is claimed is:

1. A method of producing nanophase Cu—$Al_2O_3$ composite powder, comprising:

(i) preparing a water-base solution by dissolving Cu-nitrate and Al-nitrate in amounts corresponding to a final target composition for Cu—$Al_2O_3$ composite powder;

(ii) producing a precursor powder having a molecular scale mixture of Cu, Al, $NO_3$—groups and moisture by spray drying the prepared water-based solution;

(iii) producing a desalted powder by removing volatile components of $NO_3$ groups and partially reabsorbed moisture by heat-treatment in air atmosphere, and simultaneously producing nanophase $CuO-Al_2O_3$ composite powder by oxidation of corresponding metal components; and (iv) synthesizing nanophase $Cu-Al_2O_3$ composite powder by reduction heat treatment of CuO within the desalted powder in a reducing atmosphere.

2. A method of producing nanophase $Cu-Al_2O_3$ composite powder according to claim 1, wherein the conditions of said heat-treatment in air atmosphere are set at a temperature of at least 850° C. for at least 30 minutes.

3. A method of producing nanophase $Cu-Al_2O_3$ composite powder according to claim 1, wherein the conditions of said reduction heat-treatment of CuO are set at a temperature of at least 200° C. for at least 30 minutes.

* * * * *